United States Patent
Chen

(10) Patent No.: US 8,275,018 B2
(45) Date of Patent: Sep. 25, 2012

(54) CORRELATION DEVICE AND METHOD

(75) Inventor: Kun-tso Chen, Fang-Yuan Hsiang (TW)

(73) Assignee: Mediatek Inc., Hsin-Chu (TW)

( * ) Notice: Subject to any disclaimer, the term of this patent is extended or adjusted under 35 U.S.C. 154(b) by 0 days.

(21) Appl. No.: 12/982,645

(22) Filed: Dec. 30, 2010

(65) Prior Publication Data

US 2011/0096872 A1    Apr. 28, 2011

Related U.S. Application Data

(63) Continuation of application No. 11/874,544, filed on Oct. 18, 2007, now Pat. No. 7,885,363.

(51) Int. Cl.
    *H04B 1/707*    (2006.01)
(52) U.S. Cl. .......................... 375/142; 175/150
(58) Field of Classification Search ............ 375/142, 375/150
    See application file for complete search history.

(56) References Cited

U.S. PATENT DOCUMENTS

| | | | |
|---|---|---|---|
| 5,960,040 A | 9/1999 | Cai et al. | |
| 6,430,213 B1 | 8/2002 | Dafesh | |
| 6,741,633 B1 | 5/2004 | Cangiani et al. | |
| 6,922,167 B2 | 7/2005 | Gerein | |
| 7,120,198 B1 | 10/2006 | Dafesh et al. | |
| 7,139,302 B2 | 11/2006 | Raghavan et al. | |
| 7,139,581 B2 * | 11/2006 | Berliner et al. | 455/456.1 |
| 2004/0071200 A1 | 4/2004 | Betz et al. | |
| 2004/0095989 A1 | 5/2004 | Raghavan et al. | |
| 2004/0161019 A1 | 8/2004 | Raghavan et al. | |
| 2004/0240581 A1 | 12/2004 | Salapski | |
| 2005/0012664 A1 | 1/2005 | Gerein | |
| 2005/0169409 A1 | 8/2005 | Coatantiec et al. | |
| 2005/0185700 A1 | 8/2005 | Pietila et al. | |
| 2005/0270997 A1 | 12/2005 | Julien et al. | |
| 2005/0281325 A1 | 12/2005 | Lillo et al. | |
| 2006/0038716 A1 | 2/2006 | Lestarquit | |
| 2006/0097915 A1 | 5/2006 | Martin et al. | |
| 2006/0128343 A1 | 6/2006 | Leblond et al. | |
| 2006/0212179 A1 | 9/2006 | Philips et al. | |
| 2006/0273953 A1 | 12/2006 | Watson et al. | |
| 2006/0285581 A1 | 12/2006 | Mattos | |
| 2006/0291538 A1 | 12/2006 | Cangiani et al. | |
| 2007/0274374 A1 * | 11/2007 | Abraham | 375/148 |

* cited by examiner

*Primary Examiner* — Kevin Kim

(57) ABSTRACT

A correlation device and method is provided. According to the present invention, the correlation device comprises a first signal path for receiving a received signal; at least one second signal path for receiving the received signal and eliminating effect of a subcarrier component of the received signal; and a correlation unit couple to the first signal path and each second signal path, for selecting an output of one of the first and second signal paths to execute signal correlation.

20 Claims, 6 Drawing Sheets

CORRELATION DEVICE AND METHOD

CROSS REFERENCE TO RELATED APPLICATIONS

This application is a continuation of U.S. patent application Ser. No. 11/874,544 filed Oct. 18, 2007, now U.S. Pat. No. 7,885,363 which is incorporated herein by reference in its entirety.

TECHNICAL FIELD OF THE INVENTION

The present invention relates to a correlation device used in a GNSS (Global Navigation Satellite System) receiver, more particularly, to a correlation device which is capable of processing both BOC (Binary Offset Carrier modulation) and BPSK (Binary Phase Shift Keying modulation) modulated signals.

BACKGROUND OF THE INVENTION

Nowadays, more than one GNSS system is available. A GNSS receiver has to process diverse satellite signals modulated by various modulation schemes, especially BPSK and BOC modulation schemes, in the near future.

GPS is the U.S. navigation satellite system, which is a network of satellites continuously transmits high-frequency radio signals. The signals carry time and distance information that is receivable by a GPS receiver, so that a user can pinpoint the position thereof on the earth. Galileo, the emerging European satellite navigation system, offers higher signal power and more robust modulation that will enable users to receive weak signals even in difficult environments. When combined, which provide so called "super constellation", Galileo and GPS will offer twice the number of satellite sources as currently available. This provides many advantages such as redundancy as well as greater availability for the user. In addition, positioning accuracy and integrity can be improved. Multiple satellite signals of different carriers can be used to resolve carrier phase ambiguity. Since a lot of frequency bands are available, a clean frequency band can be selected from various bands to use for the sake of anti-jamming. Further RAIM (Receiver Autonomous Integrity Monitoring) can also be improved.

GPS and Galileo systems share some signal bands with different modulation schemes (e.g. BPSK and BOC). In the coming new generation GPS, there are also different signals using the same band with different modulation schemes (BPSK and BOC). Table 1 and Table 2 respectively show GPS signal characteristics and Galileo signal characteristics.

TABLE 1

| Signal | Carrier (MHz) | Modulation | Chip Rate (Mcps) |
|---|---|---|---|
| L1 C/A | 1575.42 | BPSK-R(1) | 1.023 |
| L1 P(Y) | 1575.42 | BPSK-R(10) | 10.23 |
| L2 P(Y) | 1227.6 | BPSK-R(10) | 10.23 |
| L2C | 1227.6 | BPSK-R(1) | 1.023 |
| L5 | 1176.45 | BPSK-R(10) | 10.23 |
| L1M | 1575.42 | BOC (10, 5) | 5.115 |
| L2M | 1227.6 | BOC (10, 5) | 5.115 |
| L1C | 1575.42 | BOC (1, 1) | 1.023 |

TABLE 2

| Band | Signal | Carrier (MHz) | Modulation | Chip Rate (MHz) |
|---|---|---|---|---|
| E5 | E5a data | 1191.795 | AltBOC(15, 10) | 10.23 |
|  | E5a pilot |  |  |  |
|  | E5b data |  |  |  |
|  | E5b pilot |  |  |  |
| E6 | E6P | 1278 | BOCc(10, 5) | 5.115 |
|  | E6C data |  | BPSK-R(5) | 5.115 |
|  | E6C pilot |  | BPSK-R(5) | 5.115 |
| E2-L1-E1 | L1P | 1575.42 | BOCc(15, 2.5) | 2.5575 |
|  | L1F data |  | BOC(1, 1) | 1.023 |
|  | L1F pilot |  | BOC(1, 1) | 1.023 |

As can be seen, for example, signals L1 C/A and L1 C of the same band in GPS system have the same carrier frequency and chip rate but are modulated with different modulations, that is, BPSK-R(1) and BOC(1,1). Alternatively, signals L1 C/A in GPS and signal L1F in Galileo also have the same the carrier frequency and chip rate but are modulated with different modulation schemes, that is, BPSK-R(1) and BOC(1,1), respectively. If a receiver is required to process the different signals, the receiver must be provided with different groups of correlation units. For example, a GNSS receiver must have a correlation unit group for processing a BPSK modulated signal and another correlation unit group for processing a BOC modulated signal. When processing the BPSK modulated signal, the correlation unit group for processing the BOC modulated signal is idle. Such a waste is undesirable. Therefore, there is a need for a more efficient and flexible solution.

SUMMARY OF THE INVENTION

The present invention is to provide a correlation device and method. The BPSK signal and BOC signal can be processed by the same massive correlation units. That is, the correlation units of the correlation device can be efficiently and flexibly utilized.

In accordance with the present invention, a correlation device comprises a first signal path for receiving a received signal; at least one second signal path for receiving the received signal and eliminating effect of a subcarrier component of the received signal; and a correlation unit couple to the first signal path and each second signal path, for selecting an output of one of the first and second signal paths to execute signal correlation. The correlation unit has a multiplexer for selecting the output of one of the signal paths. In a preferred embodiment, the specific modulation scheme is BPSK (Binary Phase Shift Keying) modulation, and the second signal path is to transfer a BOC (Binary Offset Carrier) modulation form into the BPSK modulation form to eliminate the effect of the subcarrier component. The second signal path has a subcarrier remover for removing subcarrier component of the BOC modulated signal. Alternatively, the second signal path transfers the BOC modulated signal into a BPSK-like signal by taking a single side band portion of the frequency spectrum of the received signal to eliminate the effect of the subcarrier component.

In accordance with the present invention, a correlation method comprising steps of (a) receiving a signal; (b) eliminating effect of a subcarrier component of the received signal to generate a second signal; (c) selecting to pass one of the received signal and the second signal; and (d) executing correlation to the selected signal. The eliminating step comprises removing a subcarrier component of the received signal. Alternatively, the eliminating step comprises taking a single side band portion of the frequency spectrum of the received signal. The steps (a) to (d) of the method can be repeated for a plurality of rounds at the same time or in time division multiplexing (TDM) scheme, and correlation results of the respective rounds of the steps can be combined.

In accordance with the present invention, a correlation method for a GNSS receiver comprising steps of (a) receiving a signal; (b) transferring the received signal into a transferred signal with a first modulation form; (c) selecting to pass one of the received signal and the transferred signal by a selection device according to a control signal; and (d) executing correlation to the selected signal by a common correlation unit. The control signal is provided by a DSP. The transferring step comprises removing a subcarrier component of the received signal. Alternatively, the transferring step comprises taking a single side band portion of the frequency spectrum of the received signal. The steps (a) to (d) of the method can be repeated for a plurality of rounds at the same time or in time division multiplexing (TDM) scheme, and correlation results of the respective rounds of the steps can be combined.

BRIEF DESCRIPTION OF THE DRAWINGS

The present invention will be further described in details in conjunction with the accompanying drawings.

DETAILED DESCRIPTION OF THE INVENTION

Figure 1:
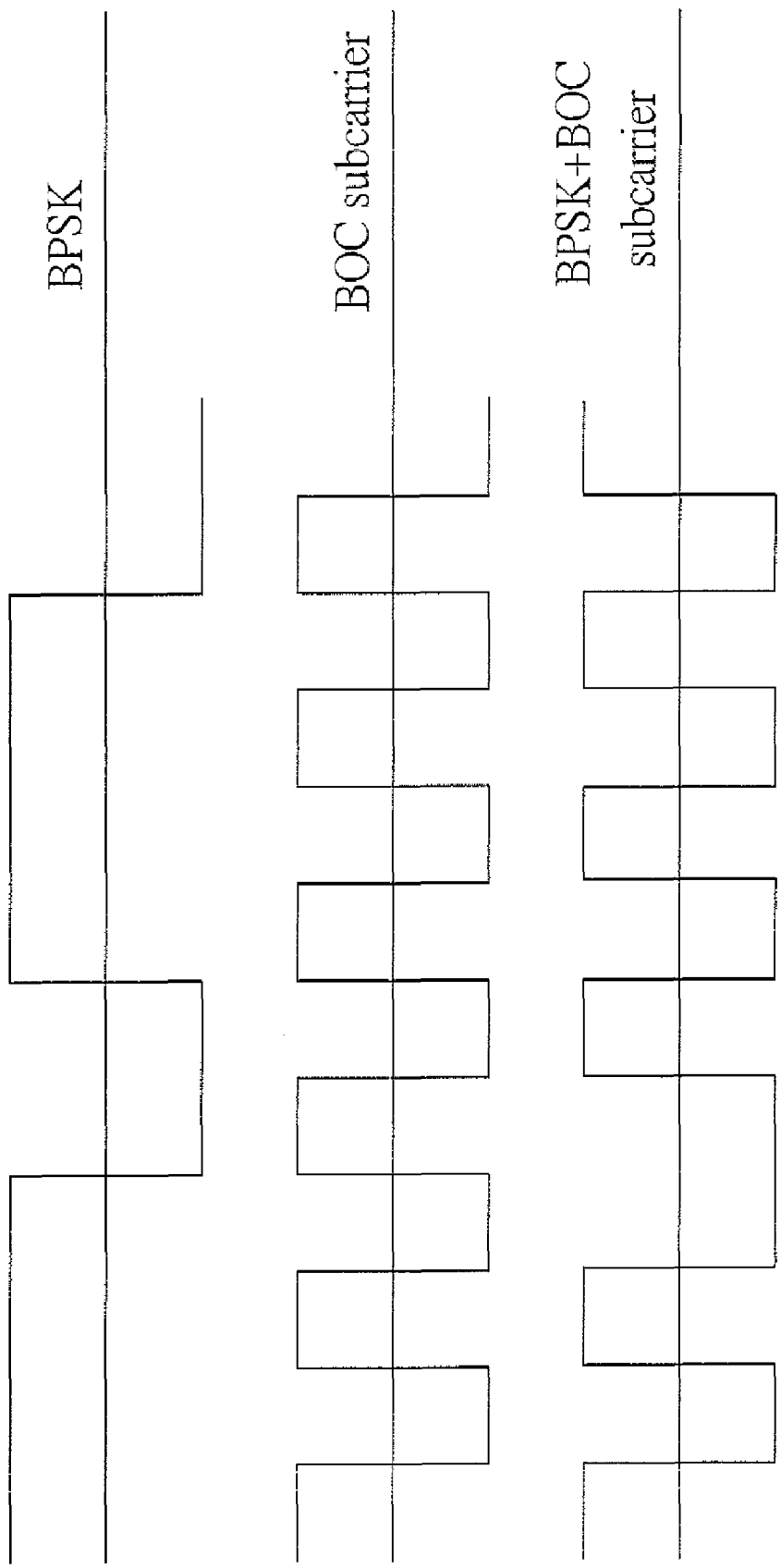
FIG. 1 is a time domain waveform diagram showing BOC (1,1) modulation.

The BOC modulation is done by multiplying a PRN spreading coded BPSK signal with a square wave subcarrier (SC). The SC has a frequency which is multiple of the code rate of the PRN spreading code. FIG. 1 is a time domain waveform diagram showing the BOC modulation. The BOC-sine (simply referred to as BOC) signal is generated by mixing a SC-sine subcarrier and a BPSK signal. The characteristics of the BOC signal are dependent on the spreading code chip rate, the subcarrier frequency, and the subcarrier phasing within one PRN code chip. The common notation for a BOC-modulated signals in the GNSS field is represented as BOC ($f_c$, $f_s$), where $f_c$ is the code chip rate, and $f_s$ is the frequency of the subcarrier. Both $f_c$ and $f_s$ are usually represented as a multiple of the reference frequency 1.023 MHz. Therefore, the BOC signal can also be represented as BOC(n,m), where n is the multiple of 1.023 MHz for the PRN code chip rate $f_c$, and m is the multiple of 1.023 MHz for the subcarrier $f_s$. The BPSK modulation scheme can be represented as:

$$s(t)=A\square C(t)\square \cos [w_0 t] \qquad (1)$$

while the BOC modulation scheme can be represented as:

$$s(t)=A\square C(t)\square \cos [w_0 t] sgn[\sin(w_s t)] \qquad (2)$$

The main difference between the BOC signal and BPSK signal is that the BOC signal is additionally modulated with the subcarrier.

Figure 2:
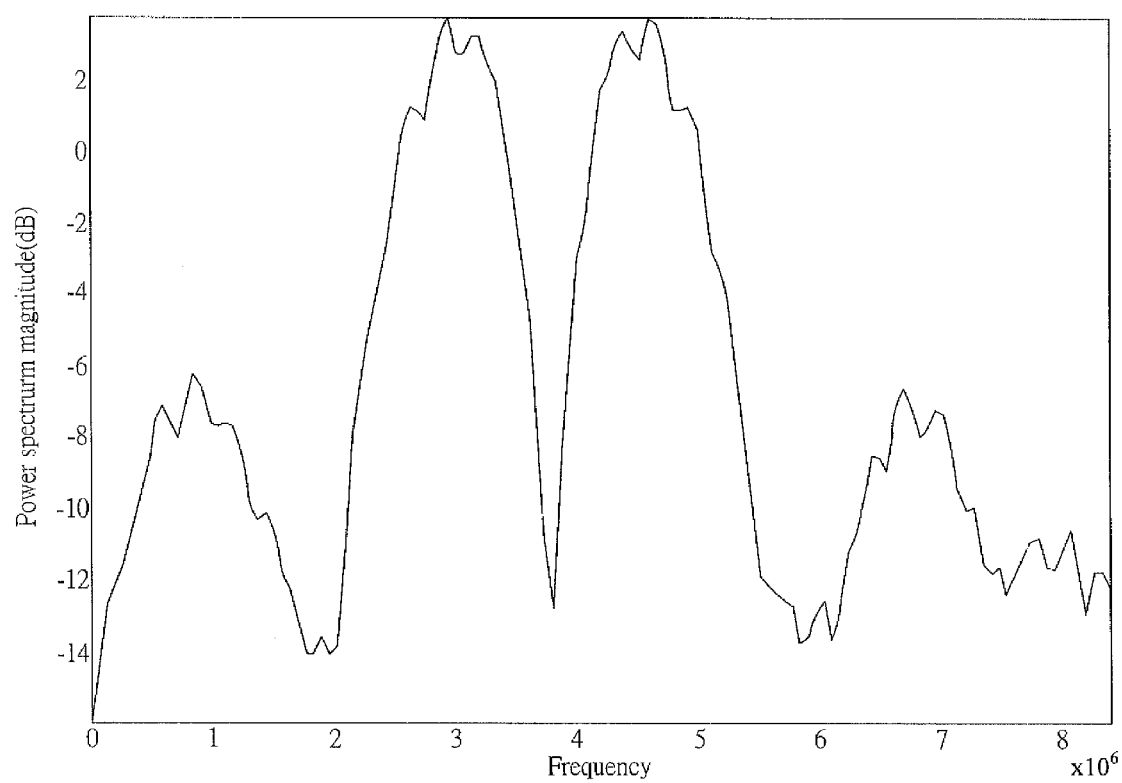
FIG. 2 is a power spectrum density diagram of a BOC(1,1) signal.

FIG. 2 is a frequency response diagram of a BOC(1,1) signal. As shown, the BOC signal has a symmetric split spectrum with two main lobes shifted from the center frequency $f_c$ by the frequency of the subcarrier $f_s$. Either one of the left and right halves of the spectrum is substantially the same as that of a BPSK signal.

Taking GPS L1 C/A and Galileo L1F signals for example, the same RF front end can be used to process both signals. The RF front end executes operations such as RF down-conversion, filtering, amplification and sampling. As can be seen from Table 1 and Table 2, these two signals are of the same band and have the same chip rate. The correlation unit executes some necessary processing functions to both BOC and BPSK signals. The necessary processing functions include Doppler frequency removal, code despreading and coherent/incoherent accumulation. That is, the main processing functions for BOC and BPSK signals are the same. However, as described, the BOC signal is additionally modulated by a specific subcarrier. Accordingly, the BOC signal needs an additional signal processing to transfer the BOC signal into a BPSK-like signal. Then, the BPSK-like signal transferred from the BOC signal can be completely processed as a BPSK signal.

Figure 3:
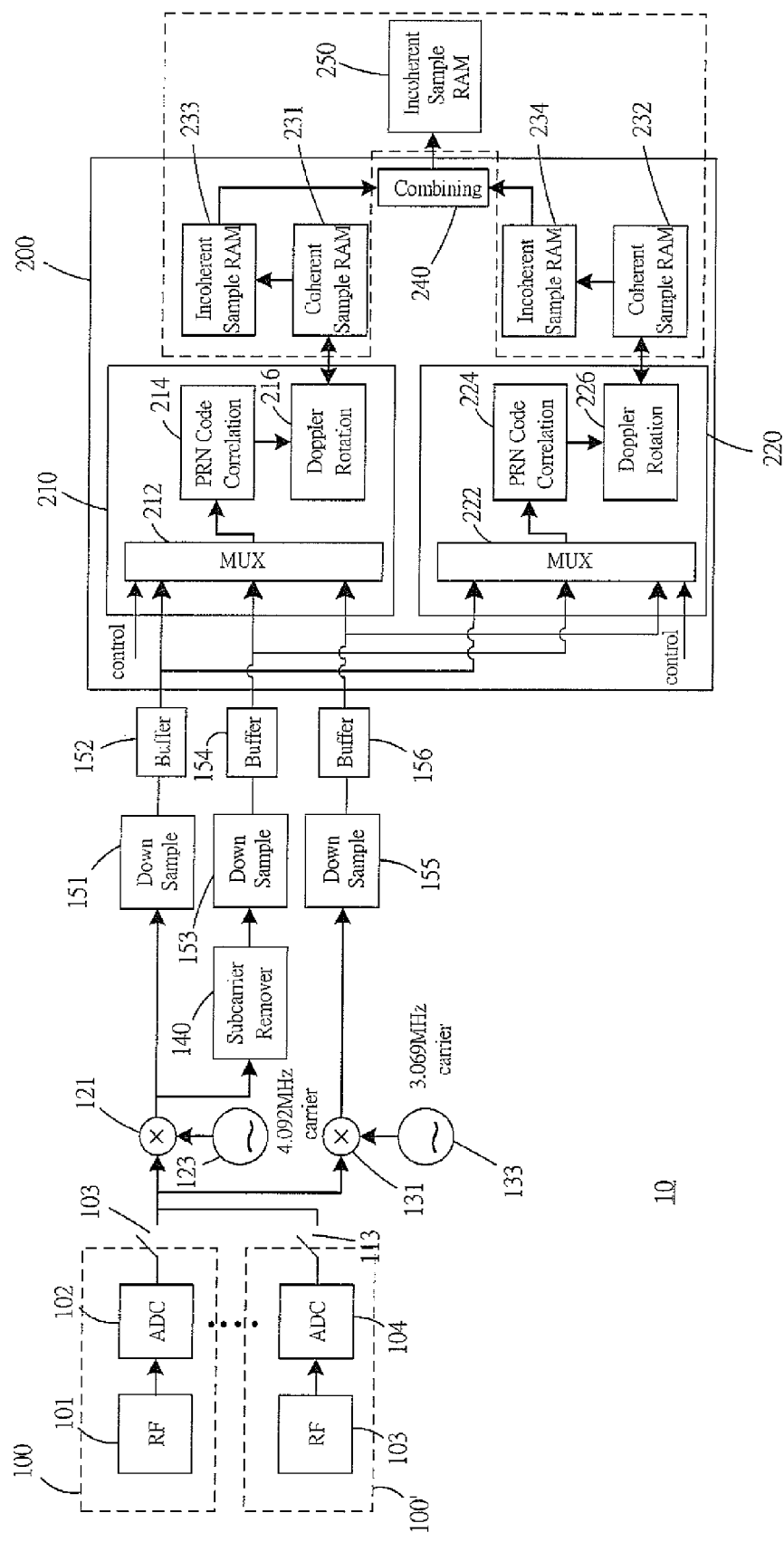
FIG. 3 is a block diagram schematically and generally showing a correlation device in accordance with an embodiment of the present invention.

FIG. 3 is a block diagram schematically and generally showing a correlation device 10 in accordance with an embodiment of the present invention. The correlation device 10 includes at least one RF front end, and taking two RF front ends as example in this embodiment. The first RF front end 100 comprises an RF processing unit 101 for executing operations such as RF down-conversion, filtering, amplification to a received satellite signal of a specific band and an analog-to-digital converter (ADC) 102 for sampling the processed signal to down convert the signal into a low IF or even baseband digital signal. The second RF front end 100' includes an RF processing unit 103 and an ADC 104 for processing a received signal of another band. Although the correlation device 10 of the present embodiment has only two RF front ends 100, 100', it can be deduced that the correlation device can have more RF front ends or only a single RF front end to process signals of different bands.

In a case that the received signal is a BPSK signal, and the signal is down converted into a low IF signal (e.g. 4.092 MHz). Then the signal is further down converted to baseband (i.e. zero IF) by a mixer 121 with a carrier provided by a carrier generator 123. It is noted that if the signal has been down converted into baseband (zero IF) after being output from the ADC, the mixer 121 and the carrier generator 123 can be omitted. A down sample unit 151 and a buffer 152 are provided on the direct signal path without transfer operation. Herein, the so called transfer operation means an operation for transferring a BOC signal into a BPSK-like signal. By using the down sample unit 151, sampling rate of the signal is reduced so as to save power for correlation. The baseband BPSK signal is then passed to a correlation unit bank 200. In the present embodiment, the correlation unit bank 200 includes two correlation units 210 and 220. The two correlation units 210 and 220 are the same and can operate in parallel. For the sake of simplification and clarity, only the correlation unit 210 is described herein. The down sampled BPSK signal is then processed by a PRN code correlation unit 214 to remove the code thereof and a Doppler rotation unit 216 to remove the Doppler frequency thereof. The processed signal is then accumulated by a coherent sample RAM (random access memory) 231 and an incoherent sample RAM 233.

In a case that a BOC signal is received, the received signal is processed by a proper one of the RF front ends 100, 100' and then is transferred into a BPSK-like signal. In the present embodiment, any of two signal paths for transferring the BOC signal into BPSK-like signal can be selected.

In one of the transferring signal paths, the BOC signal, which has been down converted into low-IF by the RF front end, is further down converted into baseband by the mixer 121 and the carrier generator 123. Similar to the above described, if the BOC signal has been down converted into baseband by the RF front end, the mixer 121 and carrier generator 123 can be omitted. The baseband BOC signal is then processed by a subcarrier remover 140. The subcarrier remover 140 is used to remove the subcarrier of the BOC signal by any proper method. For example, the subcarrier remover 140 can generate a subcarrier and mix the BOC signal with the subcarrier to remove the subcarrier component of the BOC signal. After the subcarrier component is removed, the BOC signal is transferred into a BPSK-like signal, and can be sequentially processed as a BPSK signal as described above. In the present embodiment, there are a set of down sample unit 153 and a buffer 154 provided for this signal path.

In another transferring signal path, single side band (SSB) scheme is used. As shown in FIG. 2, the frequency spectrum of the BOC signal has two main lobes. For a BOC(1, 1) signal, the two main lobes are shifted from the central frequency ($f_c$) by ±1.023 MHz. In the single side band (SSB) scheme, either one half of the frequency spectrum of the BOC signal can be selected. If the lower lobe is selected, the BOC signal is mixed by a mixer 131 with a carrier of a frequency of $f_c$−1.023 MHz provided by a carrier generator 133. If $f_c$ is 4.092 MHz, the carrier provided by the carrier generator 133 should be of 3.069 MHz. If the upper lobe is selected, the carrier should be of 5.115 MHz. In the case that the central frequency fc is zero, that is, baseband, the frequency of the carrier should be ±1.023 MHz. A set of down sample unit 155 and a buffer 156 is provided for this signal path.

In the present embodiment, the correlation unit bank 200 includes two correction units 210 and 220. For BOC signal acquisition and tracking, there are various correlation methods that can be used. BOC-PRN correlation is to utilize a local PRN code to despread the received BOC signal. BPSK-like correlation, which is suitable for BOC acquisition because the search spacing is reduced, is to utilize the local PRN code to despread one of the SSB (Single Side Band) of the BOC signal. BOC-BOC correlation, which is preferred to be used in tracking because of tracking error reduction, is to utilize the local PRN code and BOC subcarrier to despread the received BOC signal. A combination of any two or all of the above correlation methods can also be used.

In one example, the combination of BOC-PRN correlation and BOC-BOC correlation is utilized. The first correlation unit 210 is used to execute the BOC-PRN correlation and the second correlation unit 220, which comprises a PRN code correlation unit 224 and a Doppler rotation unit 226, is used to execute the BOC-BOC correlation. A coherent sample RAM 232 and an incoherent sample RAM 234 are used to accumulate the correlation results of the second correlation unit 220. The accumulated results from the incoherent sample RAM 233 and 234 can be combined by a combining unit 240 and pass to an incoherent sample RAM to be stored. It is noted that the respective storages 231, 232, 233, 234 and 250 may share the same physical memory in practice. The practical memory can be fixedly or floatingly divided into several logic regions to be used as the respective storages 231, 232, 233, 234 and 250.

In practice, no matter what the signal type is, the received signal goes through the three signal paths in parallel in each correlation unit. The first correlation unit 210 has a multiplexer 212 controlled by a control signal for selecting to pass the signal from which one of the signal paths to the successive components. That is, the multiplexer 212 is controlled to select one of the outputs from the buffers 152, 154 and 156 to be further processed with successive operations, such as code removal and Doppler frequency removal. The control signal can be generated and provided by a DSP (not shown). Similarly, the correlation unit 220 also has a multiplexer 222. Taking the above example to describe with reference to FIG. 3, combination of BOC-PRN correlation and BOC-BOC correlation for a received BOC signal is required. The multiplexer 212 of the first correlation unit 210 selects to pass the output from the buffer 152, and the multiplexer 222 of the second correlation unit 220 selects to pass the output from the buffer 154.

Figure 4:
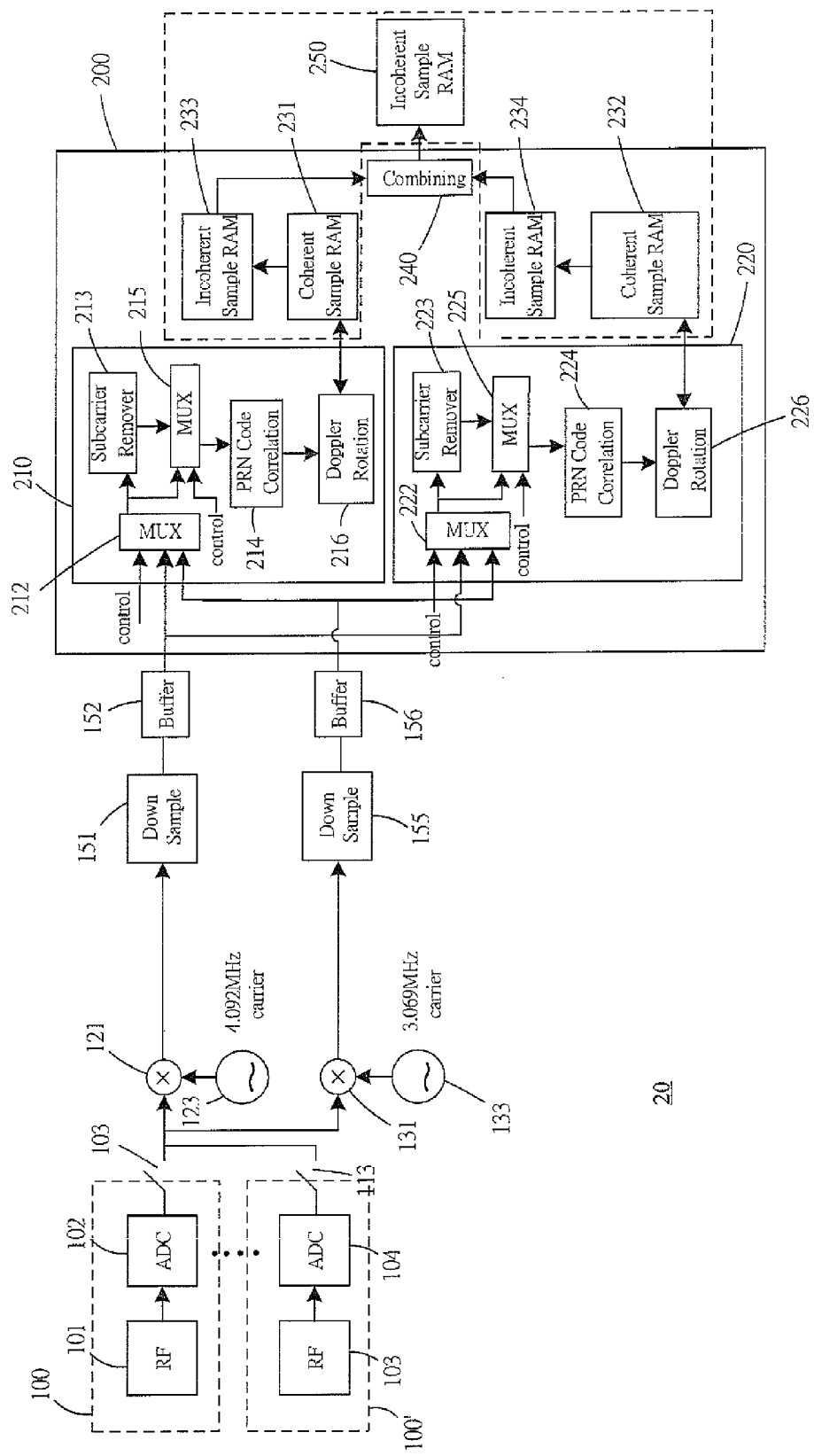
FIG. 4 is a block diagram schematically and generally showing a correlation device in accordance with another embodiment of the present invention.

FIG. 4 is a block diagram schematically and generally showing a correlation device 20 in accordance with another embodiment of the present invention. The correlation device 20 shown in this drawing is similar to that in FIG. 3, the main difference is that the subcarrier remover is disposed in each correlation unit. As shown, the first correlation unit 210 of the correlation unit bank 200 includes a subcarrier remover 213. Multiplexers 212 and 215 are controlled by control signals to select and pass the signal through the subcarrier remover 213 or not. In a case that the received signal is a BPSK signal, the received signal is processed by a proper set of RF front end and down converted into baseband by the mixers 121 and 131 with carriers provided by the carrier generators 123 and 133. The baseband signals are then down sampled and buffered by the down sample unit 151 and buffer 152, as well as the down sample unit 155 and buffer 156. In this case, the down sampled and buffered signal from the down sample unit 151 and buffer 152 is output from the multiplexer 212. The output from the multiplexer 212 is sent to the subcarrier remover 213 and the multiplexer 215. In this case, the multiplexer 215 is controlled to pass the output of the multiplexer 212 rather than the subcarrier remover 213 to the PRN code correlation unit 214. That is, the subcarrier remover 213 is "bypassed". The operations of the second correlation unit 220 including a subcarrier remover 223 are similar. The descriptions thereof are omitted herein to avoid redundancy. If the received signal is a BOC signal, and the SSB scheme is utilized, then the signal processed by a proper set of RF front end and down converted into baseband by the mixer 131 with a carrier provided by the carrier generator 133 will be selected by the multiplexer 212. The carrier generator 133 provides a carrier with a frequency of $f_c$+1.023 MHz or $f_c$−1.023 MHz. The signal is down-sampled and buffered by the down sample unit 155 and buffer 156. Then the signal is passed to the PRN code correlation 214 (224) and Doppler rotation unit 216 (226) through the multiplexers 212 and 215 (222 and 225). In this condition, the subcarrier remover 213 (223) is also "bypassed" as above. If the BOC signal is to be processed by subcarrier removal scheme, then the signal output from the subcarrier remover 213 (223) for removing the subcarrier component is selected by the multiplexer 215 (225) and passed to the successive units. The operation about the multiplexer 212 (222) is similar to the above. The signal, of which the subcarrier has been removed, is then processed by the PRN code correlation unit 214 (224) and Doppler rotation unit 216 (226). The correlation device 20 of the present embodiment also includes a combining unit 240 for combining the correlation results of the two correlation units 210 and 220.

Figure 5:
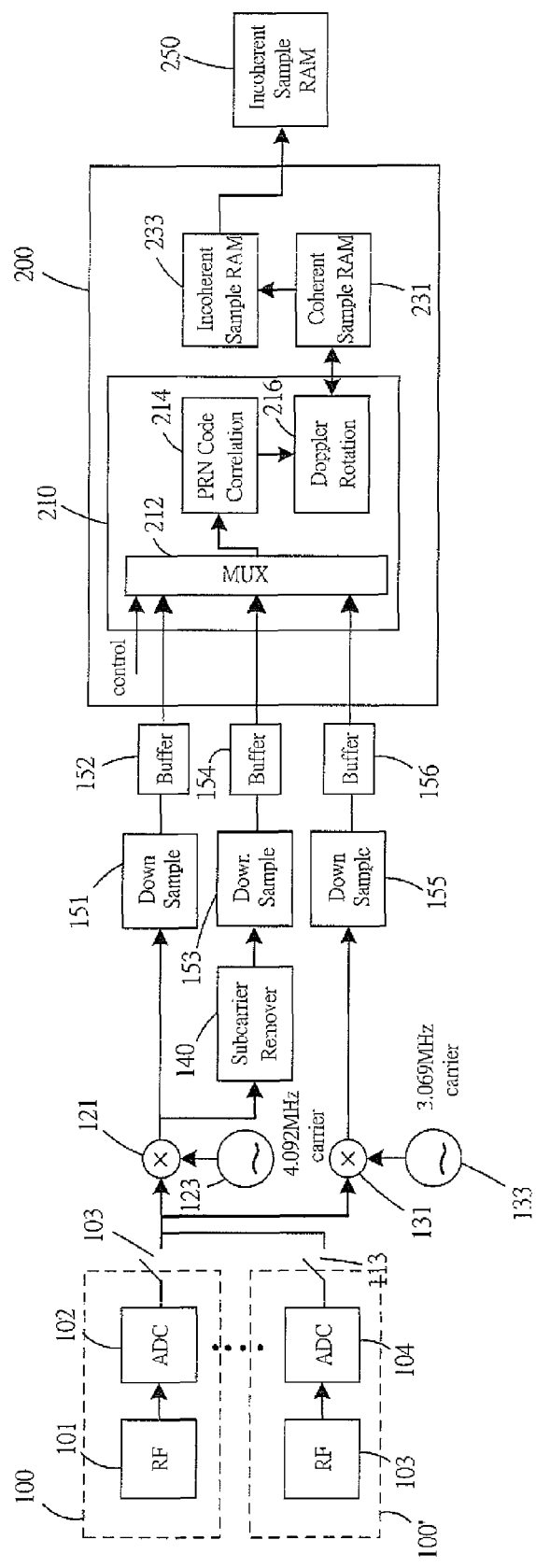
FIG. 5 is a block diagram schematically and generally showing a correlation device in accordance with still another embodiment of the present invention.

FIG. 5 is a block diagram schematically and generally showing a correlation device 30 in accordance with still another embodiment of the present invention. The correlation device 30 shown in this drawing is similar to that of FIG. 3, the same reference numbers indicate the same components. As can been seen, the correlation of the present embodiment has only one set of correlation unit 210, coherent sample RAM 231 and incoherent sample RAM 233. The single correlation unit 210 can operate in a TDM (time division multiplex) scheme. For example, in a time slot, the multiplexer 212 is controlled to pass the output from the buffer 152 to the PRN code correlation unit 214, while in the next time slot, the multiplexer 212 is controlled to pass the output from the buffer 154 to the subsequent components. The correlation results of different time slots can be accumulated in the incoherent sample RAM 250 so as to obtain a combined result. it is noted that the same TDM scheme can also be applied to the embodiment shown in FIG. 4.

Figure 6:
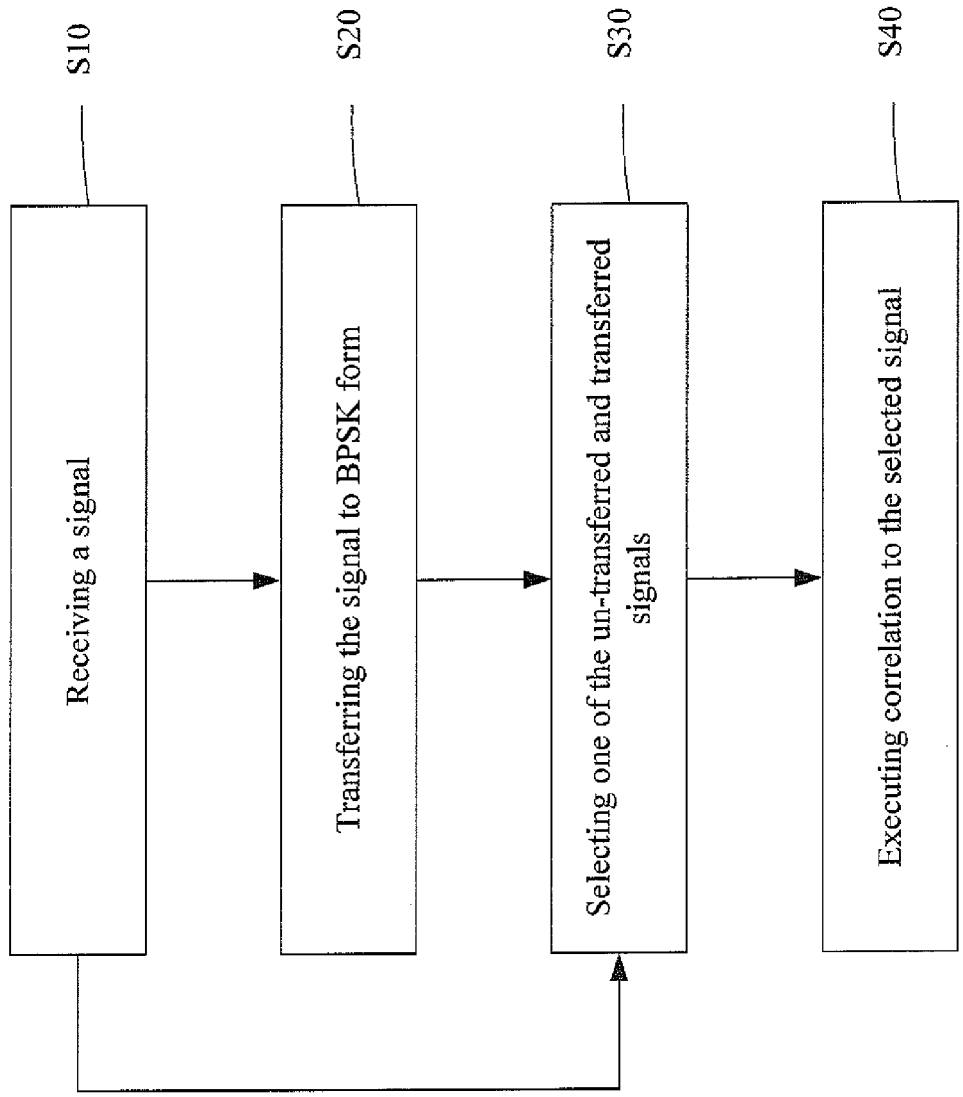
FIG. 6 is a flow chart showing a correlation method in accordance with the present invention.

The correlation method in accordance with the present invention can be generalized from the above embodiment as shown in FIG. 6, which is a flow chart showing the essential steps of the correlation method. A signal is received in step S10. In step S20, if the received signal is a BOC signal, it is transferred to a specific modulation form, such as BPSK form as described above. The transferred signal is passed to step S30. If the receiving signal is a BPSK signal, it is directly passed to step S30. It is noted that the method of the present invention does not include a step to determine the received signal is a BPSK signal or a BOC signal. This is because the received signal is both passed to the multiplexer directly and transferred then passed to the multiplexer in parallel, as described in the above embodiments. The multiplexer is controlled to select one of the transferred and un-transferred signals to pass to the correlation unit in step S30. In step S40, correlation operation is executed to the selected signal. The steps S10~S40 can be repeated for several rounds in parallel or in TDM scheme, and the correlation results of the respective rounds can be combined as desired.

While the preferred embodiment of the present invention has been illustrated and described in details, various modifications and alterations can be made by persons skilled in this art. The embodiment of the present invention is therefore described in an illustrative but not in a restrictive sense. It is intended that the present invention should not be limited to the particular forms as illustrated, and that all modifications and alterations which maintain the spirit and realm of the present invention are within the scope as defined in the appended claims.

What is claimed is:

1. A correlation device comprising:
    a first signal path for receiving a received signal;
    at least one second signal path for receiving the received signal and eliminating effect of a subcarrier component of the received signal; and
    a correlation unit coupled to the first signal path and each second signal path, for selecting an output of one of the first and second signal paths to execute signal correlation for a round;
    a combing unit coupled to the correlation unit, for combing the correlation results of respective rounds after a plurality of the rounds;
    wherein the respective rounds are executed at the same time.

2. The correlation device of claim 1, wherein one of the at least one second signal path is to transfer the received signal from a BOC (Binary Offset Carrier) modulation form into the BPSK (Binary Phase Shift Keying) modulation form to eliminate the effect of the subcarrier component.

3. The correlation device of claim 1, wherein one of the at least one second signal path has a subcarrier remover for removing subcarrier component of the received signal.

4. The correlation device of claim 1, wherein one of the at least one second signal path transfers the received signal into a BPSK-like signal by taking a single side band portion of frequency spectrum of the received signal to eliminate the effect of the subcarrier component.

5. The correlation device of claim 4, wherein one of the at least one second signal path includes a carrier generator providing a carrier and a mixer for mixing the received signal with the carrier to take the single side band portion thereof.

6. The correlation device of claim 1, wherein the correlation unit operates in TDM (time division modulation) scheme for the outputs from the first and second signal paths.

7. The correlation device of claim 1, wherein the correlation unit comprises a multiplexer for selecting the output of one of the first and second signal paths.

8. The correlation device of claim 1, further comprising more than one additional correlation unit, all of the correlation units performing signal correlation for signals from different signal paths.

9. A correlation method comprising steps of
    (a) receiving a signal;
    (b) eliminating effect of a subcarrier component of the received signal to generate a second signal;
    (c) selecting to pass one of the received signal;
    (d) executing correlation to the selected signal
    (e) repeating all of the steps (a) to (d) for a plurality of rounds; and
    (f) combining the correlation results of the respective rounds of the steps;
    wherein the respective rounds are executed at the same time.

10. The correlation method of claim 9, wherein the eliminating step comprises removing a subcarrier component of the received signal.

11. The correlation method of claim 9, wherein the eliminating step comprises providing a subcarrier and mixing the received signal with the subcarrier to remove the subcarrier component from the received signal.

12. The correlation method of claim 9, wherein the eliminating step comprises taking a single side band portion of frequency spectrum of the received signal.

13. The correlation method of claim 9, wherein the respective rounds are executed in a time division multiplexing (TDM) scheme.

14. A correlation method for a GNSS receiver, comprising steps of
    (a) receiving a signal;
    (b) transferring the received signal into a transferred signal with a first modulation form;
    (c) selecting to pass one of the received signal and the transferred signal by a selection device according to a control signal;
    (d) executing correlation to the selected signal by a common correlation unit;
    (e) repeating all of the steps (a) to (d) for a plurality of rounds; and
    (f) combining the correlation results of the respective rounds of the steps;
    wherein the respective rounds are executed at the same time.

15. The correlation method of claim 14, wherein the control signal is provided by a DSP.

16. The correlation method of claim 14, wherein the transferring step comprises removing a subcarrier component of the received signal.

17. The correlation method of claim 14, wherein the transferring step comprising providing a subcarrier and mixing the received signal with the subcarrier to remove the subcarrier component from the received signal.

18. The correlation method of claim 14, wherein the transferring step comprises taking a single side band portion of the frequency spectrum of the received signal.

19. The correlation method of claim 14, wherein the respective rounds are executed in a time division multiplexing (TDM) scheme.

20. A correlation method for a GNSS receiver, comprising steps of (a) receiving a signal and down sampling the received signal;
(b) transferring the received signal into a transferred signal with a first modulation form and down sampling the transferred signal;
(c) selecting to pass one of the down sampled received signal and the down sampled transferred signal according to a control signal;
(d) executing correlation to the selected signal by a common correlation unit.

\* \* \* \* \*